July 11, 1933.  H. SCHIMMEL  1,918,139
METHOD AND APPARATUS FOR MACHINING ROLLS FOR ROLLING MILLS
Filed Dec. 8, 1931  2 Sheets-Sheet 1
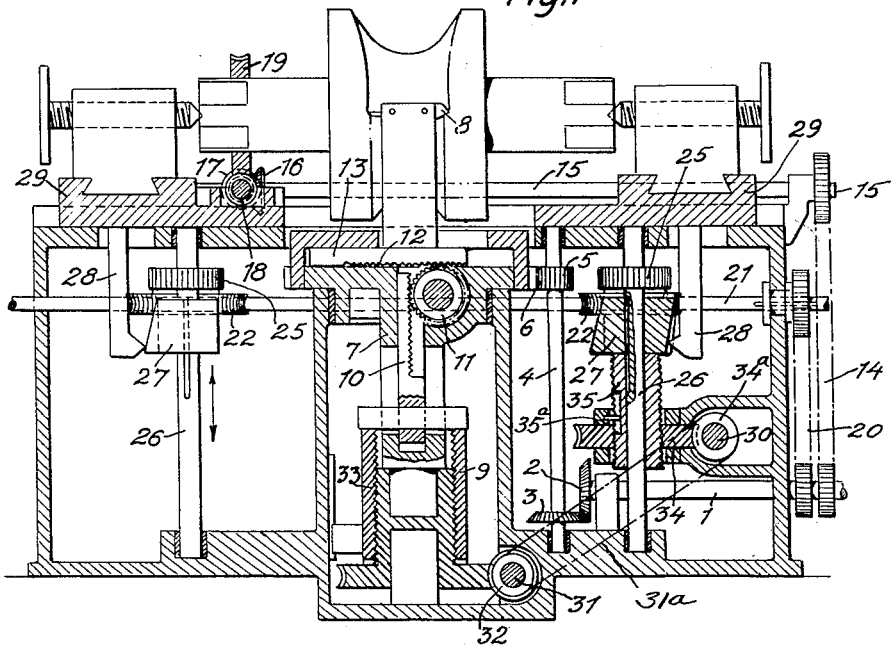
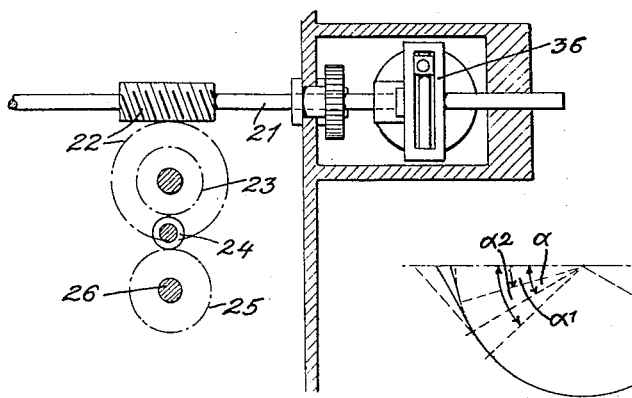
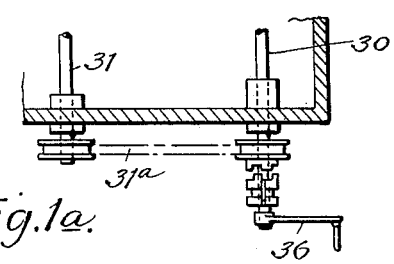
INVENTOR
HANS SCHIMMEL
BY HIS ATTORNEYS
Howson and Howson July 11, 1933. H. SCHIMMEL 1,918,139
METHOD AND APPARATUS FOR MACHINING ROLLS FOR ROLLING MILLS
Filed Dec. 8, 1931 2 Sheets-Sheet 2
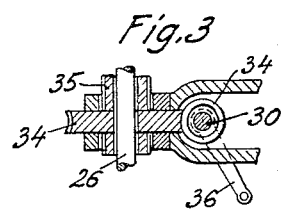
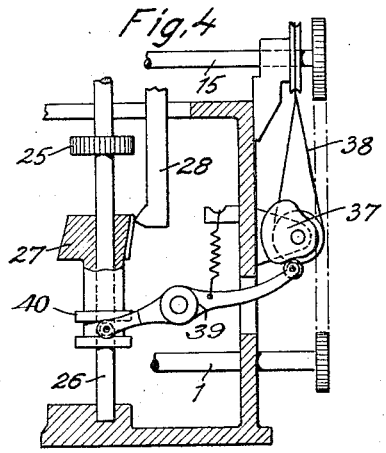
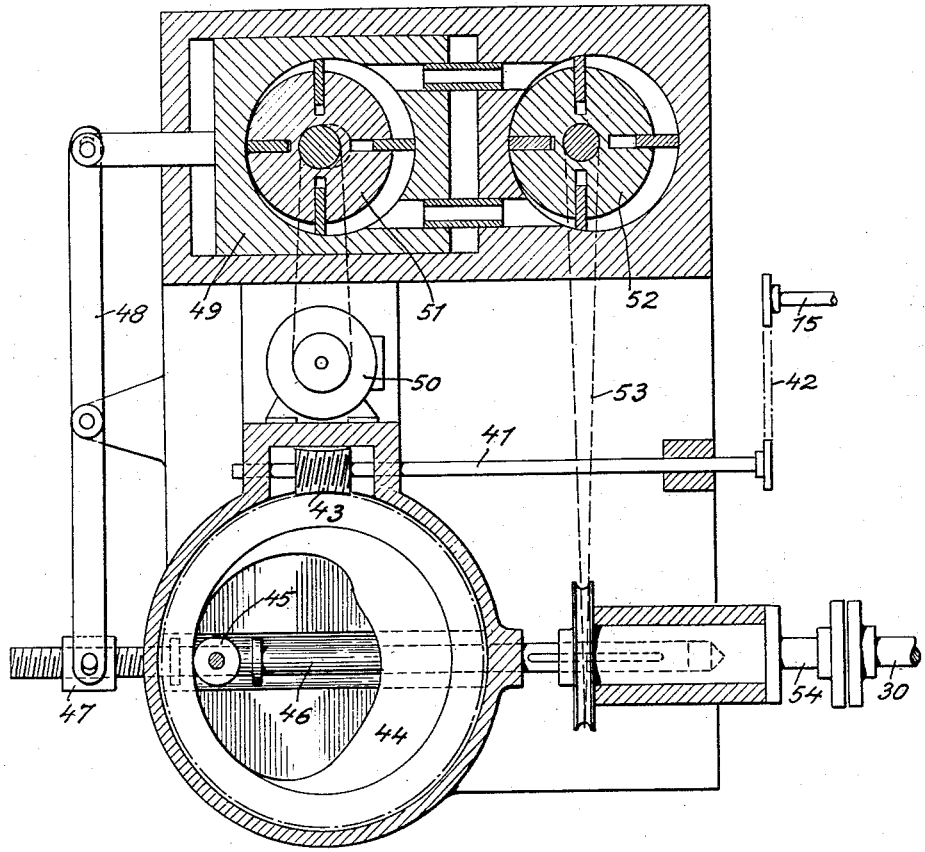
INVENTOR
HANS SCHIMMEL
BY HIS ATTORNEYS
Howson and Howson Patented July 11, 1933

1,918,139

UNITED STATES PATENT OFFICE

HANS SCHIMMEL, OF KOMOTAU, CZECHOSLOVAKIA

METHOD AND APPARATUS FOR MACHINING ROLLS FOR ROLLING MILLS

Application filed December 8, 1931, Serial No. 579,761, and in Germany January 28, 1931.

This invention relates to a method and apparatus for machining rolls for rolling mills and the like.

My older specification No. 514,620 describes apparatus for machining circumferential grooves in Pilger and like rolls in which a tool holder is arranged to extend between a pair of rolls mounted on the machine and is subjected to periodical radial displacements as the tool holder rotates whilst a tool therein effects cuts across the peripheral faces of the rolls. The radial displacements of the tool holder are arranged to effect, in conjunction with the rotational movement thereof, the cutting of inclined side portions of the grooves in the rolls, and the path of the cutter relatively to the rolls during each cut is controlled solely by movements of the tool holder, whereas according to this invention the cutting of the inclined side portions of the grooves in the rolls is effected by axial displacement of the rolls relatively to the tool holder as the same rotates.

In order that the invention may be fully understood, reference is directed to the accompanying drawings, in which:—

Figure 1 illustrates diagrammatically a vertical section of a portion of an apparatus constructed in accordance with this invention.

Fig. 1a is a sectional detail of a portion of the structure shown in Figure 1.

Figure 2 is a sectional detail of the apparatus illustrated in Figure 1, and

Figure 3 shows in part a modification of the apparatus illustrated in Figure 1,

Figure 4 illustrates a modification of the invention,

Figure 5 illustrates a further modification, and

Figure 6 is a diagram representing various forms of grooves in rolls machined by the apparatus illustrated in Figures 1 and 2 and which is hereinafter referred to.

Referring to Figures 1 and 2, a spindle 1 arranged to be driven from any source of power is coupled by bevel wheels 2, 3 to a vertically disposed spindle 4 provided at its upper end with a spur wheel 5 arranged in mesh with a ring of teeth 6 on the upper portion of a rotatable arbour 7. The arbour 7 is arranged to carry a shoe 13 slidably mounted diametrically of the said arbour and the shoe 13 carries an upwardly extending tool holder in which a cutting tool 8 is arranged to be mounted. The shoe 13 is provided with rack teeth 12 upon its underside arranged in mesh with a spur wheel 11 which is also arranged in mesh with a vertically disposed rack 10 slidably mounted in the arbour 7. The rack 10 is operatively connected to a non-rotatable sleeve 9 which is screwed on to a screw-threaded member 33 arranged to be rotated through the medium of worm and worm wheel mechanism 32 from a shaft 31. Variations in height of the sleeve 9 effect variations in the effective cutting radius of the tool 8 in the manner described in my older specification Serial No. 514,620. Each roll to be machined has a worm wheel 19 secured thereto which is arranged to be rotated by a worm 18 operatively connected by bevel wheels 17, 16 spindle 15 and chain drive 14 to the driving shaft 1, this mechanism being provided for effecting slight rotation of the rolls between successive rotations of the tool holder to feed the work to the cutting tool 8.

The driving shaft 1 is connected by a chain drive 20 to a rotatable spindle 21 which is coupled by worm and worm wheels 22 and trains of gear wheels 23, 24, 25 to a pair of vertically disposed spindles 26. Each spindle 26 is provided with a control drum 27 slidably mounted thereon and the circumference of which is in the form of a cam. Each drum 27, as it rotates with the corresponding spindle 26 is arranged to impart movement through the medium of an arm 28 to a carriage 29, upon which are mounted head stocks carrying the rolls to be machined. One of the drums 27 effects movement of the carriage 29 in one direction actually if the rolls whilst the other drum 27 effects movement of the carriage 29 in the opposite direction.

The machining of the purely circular central portion of the groove in a roll is effected by the rotation of the tool 8 with the arbour 7 only, whilst the inclined portions of the groove are machined during axial displacements of the roll with the carriage 29 in conjunction with the rotation of the tool.

Each of the control drums 27 is of varying cross-section axially thereof, so that by altering the position of the drums 27 axially of the spindles 26, different axial displacements of the rolls may be effected and correspondingly different inclinations of the side portions of a groove in a roll may be machined.

Vertical displacements of each control drum 27 on the spindle 26 are effected by the rotation of a shaft 30 through the medium of a worm gear 34, the worm wheel 34a of which is constructed as a nut screwed on to a screw-threaded sleeve 35 operatively connected to the control drum 27; only the mechanism for one of the drums 27 is illustrated in the drawings it being understood that a similar mechanism is arranged to control the other drum 27. A pin 35a prevents rotation of the sleeve 35. The shaft 30 may be rotated manually by a crank lever 36 as shown in Figure 3 to vary the position of the control drums 27 or the said shaft may be coupled to the shaft 31 by a chain drive 31a so that axial displacements of the rolls by the control drums 27 are effected in accordance with the effective cutting radius of the tool 8. Independently therefrom, the control may be effected by the hand crank 36 as shown in Figure 1a, the connection of the two shafts 30, 31 by means of the chain drive 31a being then interrupted by disconnecting the coupling.

Alternatively, the displacements of the control drum 27 may be effected by means of mechanism controlled by a template 37 as shown in Figure 4. The template 37 is rotated from the spindle 15 by a belt drive 38 and a lever 39, which engages in a ring 40 of the spindle 26.

In the modification shown in Figure 5, the shaft 41 is connected with the shaft 15 by means of a chain drive 42 or the like and causing the rotation of the rolls, travels so fast, that the template 44 is rotated by means of the worm 43 at the same speed as the rolls to be machined. In consequence the curve of the template will move the roller 45 and the latter will displace the shaft 46. The lever 48 is actuated by way of the adjustment screw 47 for return movement and so causes the pump casing 49 of the hydraulic drive hereinafter referred to, to be removed from its zero position.

During this displacement of the pump casing shown in Figure 5, the impeller 51 of the pump, being stationarily mounted and constantly driven in the same direction by means of the electric motor 50, will be moved into an eccentric position in respect of the casing 49 (as illustrated) and deliver the fluid into the hydraulic motor 52, which will commence to turn in a forward or backward direction, just according to the adjustment of the pump 49 to forward or reversed run, and which will effect an adjustment of the connecting shaft 54 and the control shaft 30 of the machine by way of the drive 53. But through the rotation of the connecting shaft 54 the shaft 46 will be likewise rotated, and the pump casing is again returned to its zero position by way of the nut 47 and the lever 48 stopping thereby the motor 50.

Referring to Figure 6 the angle α subtended by the inclined portion of the side of the groove in a roll with respect to the point from which the circular central portion of the groove is generated requires in practice to be varied and to effect such variation, the control drums 27 are arranged to be subjected to a supplementary rotation through the medium of a slot and crank mechanism 36, Figure 2, operatively connected to the spindle 21. The crank is arranged to be rotated at twice the speed of the arbour 7 and imparts an axial reciprocating motion to the spindle 21, this movement being converted by the worm and worm wheel gear 22 into the required supplementary movements of the control drums 27.

The drums 27 in turn modify the normal axial movements of the rolls supported on the carriage 29 and effect the machining of the inclined portions of the grooves in the rolls as required.

I claim

1. A method of machining the circumferential portions of rolls, for example, rolls for Pilger rolling mills, which consists in subjecting a roll to cuts axially thereof from an edge cutting tool as the tool rotates in a plane substantially parallel to or coincident with a plane extending through the axis of rotation of the roll, and the roll is moved axially so that the path of the tool relatively to the roll conforms to the contour of the desired cross section of the roll, and feeding the roll to the tool between cutting operations by rotating the roll.

2. A method of machining the circumferential portions of rolls, for example rolls for Pilger rolling mills, which consists in subjecting a pair of rolls arranged in side by side relationship with one another and with their axes parallel, to cuts axially thereof from an edge cutting tool as the tool rotates between the rolls in a plane substantially parallel to or coincident with the plane extending through the axes of the said rolls and the rolls are moved axially so that the path of the tool relatively to the rolls conforms to the contour of the desired cross section of the roll, and feeding the rolls to the tool by rotating the rolls.

3. In an apparatus for machining the circumferential portions of rolls of the type described, the combination of means for supporting at least one roll to be machined, a tool holder rotatable about an axis disposed transversely to the axis of a roll located in said supporting means, means operable automatically to move said roll axially as said tool holder rotates, and means operable to rotate said roll between rotations of said tool holder for the purpose described.

4. In an apparatus for machining the circumferential portions of rolls of the type described, the combination of means for supporting a pair of rolls to be machined with their axes disposed parallel to one another, a tool holder located between a pair of rolls so supported, means for rotating said tool holder about an axis disposed transversely to the axis of said rolls, means operable automatically to move said rolls axially as the tool holder rotates and means operable to rotate said rolls between rotations of said tool holder for the purpose described.

5. In an apparatus for machining the circumferential portions of rolls of the type described, the combination of means for supporting at least one roll to be machined, an arbour rotatably mounted about an axis disposed transversely to the axis of a roll supported by said means, means for rotating said arbour, a tool holder operatively connected to said arbour so as to rotate therewith and movable radially thereon with respect to the axis of rotation of said arbour, and mechanism operable automatically to move said roll supporting means axially of a roll supported thereby as said tool holder rotates, for the purpose described.

6. In an apparatus for machining the circumferential portions of rolls of the type described, the combination of means for supporting at least one roll to be machined, an arbour rotatably mounted about an axis disposed transversely to the axis of a roll supported by said means, means for rotating said arbour, a tool holder operatively connected to said arbour so as to rotate therewith, and mechanism operable automatically to move said roll supporting means axially of a roll supported thereby as said tool holder rotates, for the purpose described.

7. In an apparatus for machining the circumferential portions of rolls of the type described, the combination of means for supporting at least one roll to be machined, a hollow arbour rotatable about an axis disposed transversely to the axis of a roll supported by said means, means for rotating said arbour, a tool holder operatively connected to said arbour so as to rotate therewith and movable radially thereon with respect to the axis of rotation of said arbour, mechanism disposed within said arbour operable to move said tool holder radially of said arbour and mechanism operable automatically to move said roll supporting means axially of a roll supported thereby as said tool holder rotates, for the purpose described.

8. In an apparatus for machining the circumferential portions of rolls of the type described, the combination of means for supporting at least one roll to be machined, a hollow arbour rotatable about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour and arranged in mesh with a gear wheel rotatably mounted in said arbour, a second rack disposed axially of said arbour and arranged in mesh with said gear wheel, a pin carried by said second rack and extending through diametrically opposed slots formed axially in said arbour and an operatively connected between the ends of said pin and mechanism arranged exteriorly of said arbour adapted to control the radial movements of said tool holder and mechanism operable automatically to move said roll supporting means axially of a roll supported thereby as the tool holder rotates for the purpose described.

9. In an apparatus for machining the circumferential portions of rolls of the type described, the combination of means for supporting at least one roll to be machined, a hollow arbour rotatable about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour and arranged in mesh with a gear wheel rotatably mounted in said arbour, a second rack disposed axially of said arbour and arranged in mesh with said gear wheel, a pin carried by said second rack and extending through diametrically opposed slots formed axially in said arbour, a sleeve arranged around said arbour, mechanism operable to move said sleeve axially of said arbour, and mechanism operable automatically to move said roll supporting means axially of a roll supported thereby as said tool holder rotates, for the purpose described.

10. In an apparatus for machining the circumferential portions of rolls of the type described, the combination of means for supporting at least one roll to be machined, a tool holder rotatably mounted about an axis disposed transversely to the axis of a roll supported by said means, means for rotating said tool holder and at least one rotatable cam operatively connected to said roll supporting means and operable to move the same axially of said roll as said tool holder rotates for the purpose described.

11. In an apparatus for machining the circumferential portions of rolls of the type described, the combination of means for supporting at least one roll to be machined, a tool holder rotatably mounted about an axis disposed transversely to the axis of a roll supported by said means, means for rotating said tool holder, at least one rotatable cam operatively connected to said roll supporting means and operable to move the same axially of said roll as said tool holder rotates and an operative driving connection between said cam member and said tool holder.

12. In an apparatus for machining the circumferential portions of rolls of the type described, the combination of means for supporting at least one roll to be machined, a tool holder rotatably mounted about an axis disposed transversely to the axis of a roll supported by said means, means for rotating said tool holder, at least one rotatable cam drum of varying axial cross section operatively connected to said roll supporting means and operable to move the same axially of said roll as said tool holder rotates and means operable to displace said drum axially relatively to the said means operatively connecting the same to said roll supporting means for the purpose described.

13. In an apparatus for machining the circumferential portions of rolls of the type described, the combination of means for supporting at least one roll to be machined, a tool holder rotatably mounted about an axis disposed transversely to the axis of a roll supported by said means, means for rotating said tool holder, at least one rotatable cam drum of varying axial cross-section operatively connected to said roll supporting means and operable to move the same axially of said roll as said tool holder rotates and means operable to displace said drum axially relatively to the said means operatively connecting the same to said roll supporting means and an operative driving connection between said cam drum and said tool holder.

14. In an apparatus for machining the circumferential portions of rolls of the type described, the combination of means for supporting at least one roll to be machined, a tool holder rotatably mounted about an axis disposed transversely to the axis of a roll supported by said means, means for rotating said tool holder, at least one rotatable cam operatively connected to said roll supporting means and operable to move the same axially of said roll as said tool holder rotates and an operative driving connection between said cam member and said tool holder and mechanism operable automatically to accelerate and decelerate the rotation of said cam as said tool holder is uniformly rotated, for the purpose described.

15. In an apparatus for machining the circumferential portions of rolls of the type described, the combination of means for supporting at least one roll to be machined, a tool holder rotatably mounted about an axis disposed transversely to the axis of a roll supported by said means, means for rotating said tool holder, at least one rotatable cam drum of varying axial cross-section operatively connected to said roll supporting means and operable to move the same axially of said roll as said tool holder rotates, means operable to displace said drum axially relatively to the said means operatively connecting the same to said roll supporting means, an operative driving connection between said cam drum and said tool holder and mechanism operable automatically to accelerate and decelerate the rotation of said cam drum as said tool holder is uniformly rotated, for the purpose described.

16. In an apparatus for machining the circumferential portions of rolls of the type described, the combination of means for supporting at least one roll to be machined, a tool holder rotatably mounted about an axis disposed transversely to the axis of a roll supported by said means, means for rotating said tool holder, at least one cam mounted upon a rotatable spindle, means for rotating said spindle, including a worm and worm wheel, an operative connection between said cam and said roll supporting means operable to move said support axially of a roll supported thereby as said tool holder rotates, an operative driving connection between said worm and said tool holder and mechanism operable automatically to displace said worm axially in both directions as the same rotates for the purpose described.

17. In an apparatus for machining the circumferential portions of rolls of the type described, the combination of means for supporting at least one roll to be machined, a tool holder rotatably mounted about an axis disposed transversely to the axis of a roll supported by said means, means for rotating said tool holder, at least one cam mounted upon a rotatable spindle, means for rotating said spindle including a worm and worm wheel, an operative connection between said cam and said roll supporting means operable to move said support axially of a roll supported thereby as said tool holder rotates, an operative driving connection between said worm and said tool holder and crank mechanism operatively connected to said worm and operable to displace the same axially in both directions as the worm rotates for the purpose described.

18. In an apparatus for machining the circumferential portions of rolls of the type described, the combination of means for supporting at least one roll to be machined, a tool holder rotatably mounted about an axis disposed transversely to the axis of a roll supported by said means, means for rotating said tool holder, at least one cam mounted upon a rotatable spindle, means for rotating said spindle including a worm and worm wheel, an operative connection between said cam and said roll supporting means operable to move said support axially of a roll supported thereby as said tool holder rotates, an operative driving connection between said worm and said tool holder and a crank of variable radius operatively connected to said worm and operable to displace the same axially in both directions as the worm rotates for the purpose described.

19. In an apparatus for machining the circumferential portions of rolls of the type described, the combination of means for supporting at least one roll to be machined, an arbour rotatably mounted about an axis disposed transversely to the axis of a roll supported by said means, a tool holder mounted on said arbour so as to rotate therewith and movable thereon radially with respect to the axis of said arbour, mechanism operatively connected to said tool holder and operable to effect radial displacement thereof on said arbour, at least one rotatable cam drum of varying axial cross-section operatively connected to said roll supporting means and operable to move the same axially of said roll as said arbour rotates, means operable to displace said drum axially relatively to said means operatively connecting the same to said roll supporting means, an operative connection between said drum displacing means and said tool holder displacing means, and an operative driving connection between said cam drum and said arbour.

20. In an apparatus for machining the circumferential portions of rolls of the type described, the combination of means for supporting at least one roll to be machined, an arbour rotatably mounted about an axis disposed transversely to the axis of a roll supported by said means, a tool holder mounted on said arbour so as to rotate therewith and movable thereon radially with respect to the axis of said arbour, mechanism operatively connected to said tool holder and operable to effect radial displacement thereof on said arbour, at least one rotatable cam drum of varying axial cross-section operatively connected to said roll supporting means and operable to move the same axially of said roll as said arbour rotates, means operable to displace said drum axially relatively to said means operatively connecting the same to said roll supporting means, an operative connection between said drum displacing means and said tool holder displacing means, an operative driving connection between said cam drum and said arbour and mechanism operable automatically to accelerate and decelerate the rotation of said cam drum as said tool holder is uniformly rotated.

21. In an apparatus for machining the circumferential portions of rolls of the type described, the combination of means for supporting at least one roll to be machined, an arbour rotatably mounted about an axis disposed transversely to the axis of a roll supported by said means, a tool holder mounted on said arbour so as to rotate therewith and movable thereon radially with respect to the axis of said arbour, mechanism operatively connected to said tool holder and operable to effect radial displacement thereof on said arbour, at least one rotatable cam drum of varying axial cross-section operatively connected to said roll supporting means and operable to move the same axially of said roll as said arbour rotates, means operable to displace said drum axially relatively to said means operatively connecting the same to said roll supporting means, an operative connection between said drum displacing means and said tool holder displacing means, and an operative driving connection between said cam drum and said arbour, including a worm and worm wheel and crank mechanism operatively connected to said worm and operable to displace the same axially in both directions as the worm rotates for the purpose described.

22. In an apparatus for machining the circumferential portion of rolls of the type described, the combination of means for supporting at least one roll to be machined, an arbour rotatably mounted about an axis disposed transversely to the axis of a roll supported by said means, a tool holder mounted on said arbour so as to rotate therewith and movable thereon radially with respect to the axis of said arbour, mechanism operatively connected to said tool holder and operable to effect radial displacement thereof on said arbour, at least one rotatable cam drum of varying axial cross-section operatively connected to said roll supporting means and operable to move the same axially of said roll as said arbour rotates, means operable to displace said drum axially relatively to said means operatively connecting the same to said roll supporting means, an operative connection between said drum displacing means and said tool holder displacing means, and an operative driving connection between said cam drum and said arbour, including a worm and worm wheel and a crank of variable radius operatively connected to said worm and operable to displace the same axially in both directions as the worm rotates for the purpose described.

23. In an apparatus for machining the circumferential portions of rolls of the type described, the combination of means for supporting at least one roll to be machined, an arbour rotatably mounted about an axis disposed transversely to the axis of a roll supported by said means, a tool holder mounted on said arbour so as to rotate therewith and movable thereon radially with respect to the axis of said arbour, mechanism operatively connected to said tool holder and operable to effect radial displacement thereof on said arbour, at least one rotatable cam drum of varying axial cross-section operatively connected to said roll supporting means and operable to move the same axially of said roll as said arbour rotates, means operable to displace said drum axially relatively to said means operatively connecting the same to said roll supporting means, an operative connection between said drum displacing means and said tool holder displacing means, and an operative driving connection between said cam drum and said arbour, including a worm and worm wheel, crank mechanism operatively connected to said worm and operable to displace the same axially in both directions as the worm rotates for the purpose described, and a driving connection between said crank and said arbour whereby said crank is rotated at twice the speed of said arbour.

24. In an apparatus for machining the circumferential portions of rolls of the type described, the combination of means for supporting at least one roll to be machined, an arbour rotatably mounted about an axis disposed transversely to the axis of a roll supported by said means a tool holder mounted on said arbour so as to rotate therewith and movable thereon radially with respect to the axis of said arbour, mechanism operatively connected to said tool holder and operable to effect radial displacement thereof on said arbour, at least one rotatable cam drum of varying axial cross-section operatively connected to said roll supporting means and operable to move the same axially of said roll as said arbour rotates, means operable to displace said drum axially relatively to said means operatively connecting the same to said roll supporting means, an operative connection between said drum displacing means and said tool holder displacing means, and an operative driving connection between said cam drum and said arbour, including a worm and worm wheel, a crank of variable radius operatively connected to said worm and operable to displace the same axially in both directions as the worm rotates for the purpose described and a driving connection betwen said crank and said arbour.

25. In an apparatus for machining the circumferential portions of rolls of the type described, the combination of means for supporting at least one roll to be machined, an arbour rotatably mounted about an axis disposed transversely to the axis of a roll supported by said means, means for rotating said arbour, a tool holder mounted upon said arbour so as to rotate therewith and movable thereon radially with respect to the axis of said arbour, mechanism operable to effect said radial displacement of said tool holder, a pair of cam drums of varying axial cross-section, each mounted upon and rotatable with a spindle, means for rotating said spindles in unison including at least one worm and worm wheel, driving connections between said cam drums and said roll supporting means operable to move said support axially of a roll supported thereby as said arbour rotates, mechanism operatively connected to said cam drums and operable to displace the same axially relatively to said means operatively connecting the same to said roll supporting means, an operative driving connection between said worm and said tool holder and mechanism operable automatically to displace said worm axially in both directions as the same rotates.

26. In an apparatus for machining the circumferential portions of rolls of the type described, the combination of means for supporting at least one roll to be machined, an arbour rotatably mounted about an axis disposed transversely to the axis of a roll supported by said means, means for rotating said arbour, a tool holder mounted upon said arbour so as to rotate therewith and movable thereon radially with respect to the axis of said arbour, mechanism operable to effect said radial displacement of said tool holder, a pair of cam drums of varying axial cross-section each slidably mounted upon and rotatable with a spindle, means for rotating said spindles in unison including at least one worm and worm wheel, driving connections between said cam drums and said roll supporting means operable to move said support axially of a roll supported thereby as said arbour rotates, mechanism operatively connected to said cam drums and operable to displace the same axially on said spindle relatively to said means operatively connecting the same to said roll supporting means, an operative driving connection between said worm and said tool holder, a crank mechanism operatively connected to said worm and operable to displace the same axially in both directions as the same rotates and an operative driving connection between said crank and said arbour whereby the said crank is rotated at twice the speed of said arbour.

27. In an apparatus for machining the circumferential portions of rolls of the type described, the combination of two pairs of head stocks mounted upon a carriage, said pairs of head stocks being operable to support a pair of rolls to be machined with their axes parallel to one another, an arbour rotatably mounted about an axis disposed transversely to the axis of said rolls, means for rotating said arbour, a tool holder extending between said rolls and mounted upon said arbour so as to rotate therewith and slidable radially thereon with respect to the axis of said arbour, mechanism operatively connected to said tool holder and operable to displace the same radially on said arbour, a pair of cam drums of varying axial cross-section, each slidably mounted upon and rotatable with a spindle, means for rotating said spindles in unison including at least one worm and worm wheel, a pair of arms secured to said carriage and each operable to co-act with one of said cam drums whereby said carriage is moved axially in both directions as said cam drums rotate, mechanism operatively connected to said cam drums and operable to displace the same axially relatively to said arms, an operative driving connection between said worm and said arbour, a crank operatively connected to said worm and operable to displace the same axially in both directions as the same rotates and an operative driving connection between said crank and said arbour whereby said crank is rotated at twice the speed of said arbour.

In testimony whereof, I have signed my name to this specification.

HANS SCHIMMEL.